UNITED STATES PATENT OFFICE.

JOHN M. DONOHUE, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER SOLVENT AND COMPOSITION.

1,394,505.     Specification of Letters Patent.     Patented Oct. 18, 1921.

No Drawing.     Application filed January 10, 1921. Serial No. 436,331.

*To all whom it may concern:*

Be it known that I, JOHN M. DONOHUE, a citizen of the United States of America, residing at Rochester, in the county of Monroe and State of New York, have invented certain new and useful Improvements in Cellulose-Ether Solvents and Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use.

In U. S. Patent No. 1,188,376, Lilienfeld, June 20, 1916, there are disclosed a series of alkyl ethers of cellulose. Certain of these are practically insoluble in water, and my invention relates to the ethers having that property. While such ethers form thin solutions in ethyl alcohol or chloroform, it has been found that these single solvents by themselves will not dissolve a sufficient proportion of the ethers to make a desirably thick, flowable composition or dope, such as may be used in the manufacture of photographic film base by the customary methods. I have discovered that an adequately strong and useful solvent may be prepared by mixing these substances. The mixtures may vary from one containing 95% of ethyl alcohol and 5% of chloroform to one that consists of 99% chloroform and 1% ethyl alcohol, the proportions being by weight. Outside of this range of proportions the combinations of these substances give weaker solutions from which undesirable film is formed.

I will now describe the preferred embodiment of my invention by way of illustration. I mix chloroform and ethyl alcohol in equal parts by weight and dissolve ethyl cellulose therein until a thick, viscous, flowable solution thereof is obtained. Other substances which impart suppleness, or incombustibility, or other qualities to the film may be then added to the dope, such modifying agents being, for example, triphenyl phosphate, camphor, monochlornaphthalene, or tricresyl phosphate.

The ingredients are of the ordinary commercial type and sufficiently purified for the process of film manufacture, so as to give a dope yielding film having the proper relative freedom from color. The viscous-flowable dope above described can be used in connection with the usual film-forming apparatus without the necessity of expensive alterations in the latter.

Having thus described my invention, what I claim as new and desire to secure by Letters Patent is:

1. A viscous flowable film-forming composition, consisting essentially of an alkyl ether of cellulose dissolved in a mixture of chloroform and ethyl alcohol.

2. A viscous flowable film-forming composition, comprising an alkyl ether of cellulose dissolved in a solvent consisting essentially of from 5 to 99 parts of chloroform and 95 to 1 part by weight of ethyl alcohol.

3. A viscous flowable film-forming composition, comprising ethyl cellulose dissolved in a compound solvent consisting essentially of substantially equal parts by weight of chloroform and ethyl alcohol.

Signed at Rochester, New York, this 5th day of January 1921.

JOHN M. DONOHUE.